3,089,778
SOIL RETARDANT COMPOSITION AND
MATERIAL TREATED THEREWITH
Elliot S. Pierce, Kensington, Md., and Stanley S. Slowata,
New Brunswick, and Samuel James O'Brien, Dunellen,
N.J., assignors to American Cyanamid Company, New
York, N.Y., a corporation of Maine
No Drawing. Original application Mar. 21, 1957, Ser.
No. 647,485. Divided and this application Dec. 30,
1959, Ser. No. 862,793
6 Claims. (Cl. 106—2)

The present invention relates to compositions comprising basic aluminum salts, their process of manufacture, and to the process for using such compositions to impart soil resistance to textile materials, as well as to the materials so treated.

The compositions of the present invention are effective to improve the resistance to soiling or reduce the adherence or attraction of soil particles to textile materials and, in particular, fabrics, either flat or pile.

In the textile field and particularly in the rug industry, where in recent years widespread usage has been made of pastel colors and the number of non-wool rugs, such as cotton and rayon or blends of these with wool have increased, the need for effective soil retardants has increased, both because of the colors employed and the fact that these materials soil more readily.

In response to the growing demand, numerous compositions have become available which function to impart soil resistance to textile materials and, in particular, rugs. Certain of these were organic in nature and applied as solutions and dried. Generally speaking, soil retardants of this type were less effective than water-insoluble inorganic types. These inorganic materials, while effective as soil retardants, suffer from severe limitations. Certain of these materials produce dusting, which limits their commercial acceptability, while others tend to so modify the "hand" of the treated material that their widespread commercial acceptance is seriously restricted.

In addition, many of the textile materials treated with inorganic materials of the prior art for soil retardancy cannot be dried after treatment at temperatures significantly over 100° C. in that the soil retardant inorganic material tends to discolor.

In the preparation of insoluble inorganic soil retardants of the prior art, the product is usually not useable directly from the reaction medium, and the manufacturer is frequently obliged to wash a precipitated product with large volumes of water to free a filter cake of undesirable ions resulting from the reaction. This requires additional processing and thus expense.

A very severe limitation on the commercial acceptance of certain of these water-insoluble inorganic materials as soil retardants is the fact that they cannot readily be shipped or transported from the point of manufacture to the point of use as a dry powder. This is true with respect to many of these inorganic materials in that the user, that is, the one applying them to the textile material, is unable o redisperse in aqueous medium the dried powder obtained from current products so as to obtain the proper particle size to use. This is because drying of current products yields masses of hard aggregates which are either not redispersible or require drastic milling to effect dispersion, and the user usually does not possess the milling or grinding equipment necessary. In addition, finishers are reluctant to go through a number of mechanical steps such as, for example, regrinding the dried insoluble material and adding known dispersing agents to make up a batch, the preferred technique being simply to add to a pad bath or similar solution a readily mixed quantity of a stable dispersion.

In most instances, these insoluble inorganic materials may only be prepared in stable dispersion having solid contents up to about 30%. The net effect of this is that for every 30% by weight of active solids in a given container, 70% of water is also being shipped. Obviously, if a finisher could acquire a dry powder and readily prepare a dispersion of a desired concentration himself, without the need of milling or grinding and adding additional wetting or surface active agents, he would prefer to do so in that this procedure would be more highly economical to him.

Thus, it is an object of the present invention to provide novel compositions of insoluble basic aluminum salts which are suitable for imparting soil resistance to textile fabrics.

It is a further object to provide a process for making such compositions, for their application to textile materials, and to provide a textile fabric having the novel composition thereon.

It is a further object to provide a novel composition which may be applied to textile materials without significantly affecting the "hand" of the treated material and which does not alter the color of the treated material or produce whitening, as such change is known to those skilled in the art. In addition, it is an object to provide such a composition which does not result in significant dusting.

It is a further object to provide a soil retardant which, when applied to textile materials, the treated material may be dried at temperatures significantly in excess of 100° C. without discoloration. This permits the user or mill to more efficiently employ equipment and/or space, in that greater output in shorter times may be achieved.

Another object of the present invention is to provide a soil retardant and process for preparing the same which may be used directly from the reaction medium, and which does not require washing of the precipitated product with large volumes of water, thus eliminating extra processing on the part of the manufacturer.

It is particularly important object of the present invention to provide a soil retardant composition which may be dried to a powdery state and readily redispersed in aqueous medium without the aid of tedious milling or grinding or the addition of conventional dispersing agents.

These and other objects and advantages of the present invention will become apparent from the detailed description set forth hereinbelow.

According to the present invention, a process is provided for treating textile materials to impart soil resistance thereto which comprises applying to said material in effective amounts a stable dispersion comprising a water-insoluble basic aluminum salt having an ultimate particle size of less than .5 micron.

In the preparation of the basic aluminum salt composition, a water-soluble aluminum salt of an inorganic acid such as salts of sulfuric acid, sulfurous acid, hydrochloric acid, hydrobromic acid, nitric acid, nitrous acid, and the like are employed. Such salts include, by way of example, aluminum sulfate, aluminum chloride, and aluminum nitrate. These compounds or their equivalents may be employed singly or in combination with one another. Frequently, these materials are most readily available in the form of their hydrates, and with respect to aluminum sulfate, that hydrate known as alum $[Al_2(SO_4)_3 \cdot 18H_2O]$ is readily available and preferred. While the alum illustrated herein has 18 molecules of water of crystallization, alums having 17 or even 16 moles of combined water are also fully contemplated, as are all of the known hydrates of this or any of the above illustrated or equivalent materials. The basic aluminum salt composition of this invention may be prepared by reacting a water-soluble alkali metal salt of an organic acid with a water-soluble aluminum salt of an inorganic mineral acid, or an alkaline material other than an alkali metal salt of an organic acid, with a water-soluble salt of an inorganic mineral acid. In addition, an aluminum salt of an organic acid may be reacted with an alkaline material other than alkali metal salts of organic acids. Preferably, these reactions and known variations therein, either alone or in combination with one another, are carried out by mixing aqueous solutions of the reactants. As an alternative, for example, where the reactants contain significant amounts of water of crystallization, they may be mixed or ground together so that these products dissolve and react in their own water of crystallization. This latter alternative is obviously confined to those salts which contain water of crystallization and, in addition, is less desirable from the point of production.

As a further alternative, either the water-soluble aluminum salt or the alkaline material may be used in the reaction in a substantially dry state, so long as the other essential component of the reactant is in aqueous solution and there is sufficient water present to result in a free-flowing dispersion.

Whether the alkaline material is added into the water-soluble aluminum salt, a solution of which would have an acidic pH, or the reverse is true, that is, the water-soluble aluminum salt is added to the alkaline material (basic pH) the pH of the final reaction mixture must be from between about 6.5 and 8.0, and preferably from between about 7 and 7.5. The pH value may be determined in conventional manner, by employing a pH meter or indicator. Since the end use of the final product is in the textile field as a soil retardant material, the characteristic of the final dispersion having a substantially neutral pH is a highly desirable one.

As examples of suitable alkaline materials, there are the alkali metal oxides and hydroxides, carbonates, bicarbonates, phosphates and borates, as well as the alkaline earth oxides, hydroxides, carbonates, phosphates and borates, and including ammonium compounds, such as ammonium hydroxides, carbonates, borates and phosphates and/or mixtures of these materials. When these water-soluble inorganic alkalizing agents are employed with the water-soluble aluminum salts of inorganic mineral acids, the resulting basic salt composition may generally be termed a composition of inorganic basic aluminum salts.

In order to prepare water-insoluble organic basic aluminum salts, a water-soluble aluminum salt of an inorganic mineral acid is preferably reacted with a water-soluble alkali metal salt of a suitable organic acid, examples of which include acetic acid, propionic acid, butyric acid, and the like. Examples of water-soluble salts of these materials suitable for use in the preparation of the basic aluminum salts employed in the process of the present invention are sodium acetate, sodium propionate, sodium butyrate, potassium propionate, lithium acetate, cesium propionate, and the like. Suitable salts may be used either singly or in combination with one another, according to this invention.

The water-soluble alkaline material, whether it be inorganic, such as sodium hydroxide, or an alkali metal salt of an organic acid, such as sodium acetate, are employed in the reaction in amounts which are insufficient to convert the water-soluble aluminum salt to the insoluble hydrate, but in sufficient amount to insure that the resulting precipitated composition contains a significant amount of a basic aluminum salt or mixtures of basic aluminum salts. In this connection, it should be noted that the composition of the precipitate does not appear to have any definite fixed chemical formulation, but is believed to contain mixtures of various basic salts, minor amounts of aluminum hydrate, as well as minor residual amounts of the initial reactants. With respect to residual amounts of reactants which are water-soluble and which may become occluded in the insoluble precipitate, it is believed that this amount should not exceed about 12% of the total dry weight of the solid precipitate. In many instances, it has been found that minor amounts of such impurities are not wholly undesirable and, in certain specific instances, it has been found that where the amount contained in the final product is less than about 1%, the highly desirable property of ready redispersibility of the basic aluminum salt composition is reduced and therefore the composition is less satisfactory for general purposes. In fact, the entire reaction mixture may be used (e.g., Example 6 and following) and if any separation is made, it is unnecessary and, in some instances, undesirable to wash soluble salts from the filter cake. In this connection, if washing of a filter cake is desired, it has been determined that from between about 20% to about 100% of the total volume of water employed in the original reaction mixture produces a satisfactory product. Regardless of whether the reaction product is further processed or not after formation, when the precipitate has formed and the pH of the reaction mixture is between 6.5 and 8, the product has the desired characteristics.

While the amounts of water-soluble aluminum salt and water-soluble alkaline material employed in the present process are those amounts which will give a reaction mixture having a pH within the above indicated range, it has been determined that normally from between about 1.5 and about 2.9 equivalents of the alkaline reagent for 3 equivalents of the soluble aluminum salt are necessary to achieve a pH value within the above indicated range. Preferably, from between about 2.2 and about 2.7 equivalents of the alkaline reactant to 3 equivalents of the soluble aluminum salt are employed.

Employment of the reactants so that the resulting mixture has a pH within the values designated hereinabove results in products believed to have the following general formula:

$$Al(OH)_{3-x}(Y)_{x/z}$$

wherein $x$ is a value greater than 1.5 up to and including 2.9, Y is an anion of the soluble aluminum salt reactant of the present process and $z$ is the valence of said anions.

In carrying out the process of this invention, heat is not essential. However, it may be employed and to advantage in certain instances. If employed, care must be taken that its use with particular reactants does not increase operating difficulties such as increasing gelation, and the like. Normally, when the process is carried out at room temperature, uniformly good results are obtained.

The insoluble basic aluminum salt compositions of the present invention may be applied to surfaces and in particular textile materials in order to reduce their tendency to soiling by spraying, immersion, dipping, padding, exhaustion, or any other well-known general finishing process. This composition is normally employed on textile materials in amounts from between .25% and 5%, based on the weight of the fabric and, in the case of pile fabric, such as carpets and the like, based on the weight of the pile, and preferably in amounts of from between .5 and 1.5%, based on identical weight standards. Amounts significantly less than .25%, in most instances, are too low a concentration to effectively reduce soiling. When the amounts employed are in excess of 5%, while its resistance to soiling may be good, undesirable harshening of the hand of the treated fabric, dusting, and in some cases, whitening of the fabric, are incurred. All of these are undesirable.

The basic aluminum salts prepared by the process described herein have an average working particle size of between 0.5 and 1.5 microns and an ultimate particle size of less than 0.5 micron. Many of the particles in the dispersion do, of course, have working or aggregated particle sizes down to the order of .001 micron and less, and conversely these dispersions contain larger working particle sizes in minor amounts. These particle sizes may be from between 5 and 50 microns. With respect to this latter group, it is believed that it never constitutes more than 10% of the basic salt composition and thus does not impair its utility.

The particle size is an important aspect of the present invention, in that if particle sizes larger than the average particle size are present in substantial quantities as, for example, in amounts of 20% or more of the total composition, the effectiveness of the composition for purposes of imparting soil retardance is greatly diminished. It is an advantage of the present invention that the basic aluminum salts employed herein, prepared according to the procedure outlined hereinabove and by way of example in greater detail hereinafter, substantially uniformly results in an ultimate particle size of less than .5 micron, and an average particle size of from between 0.5 to 1.5 microns.

After the textile material has been treated with the basic aluminum salt according to the present invention, the so treated fabric is dried. This may be accomplished by air drying, utilizing tenter frames, tumble drying, or any other suitable means. Normally, temperatures substantially in excess of 150° C. should be avoided. Lower temperatures may, of course, be employed with attendant increase in time being required.

The employment of the basic aluminum salts according to the present invention as soil retardant materials, as will be seen more fully hereinafter, are competitive with commercial soil retardant materials with respect to their soil retardancy and other effects on the treated material and, in addition, have the tremendous advantage that they may be readily shipped as dried powder, thereafter being readily redispersed at the site of use to form stable dispersions. This aspect of ready redispersibility of the dried product of this invention is particularly apparent where dispersions containing between about 3 and 30% solids are concerned, and more particularly where the concentration of basic salt solids in the dispersion is between 5 and 20%.

In order that the present invention may be more fully understood, the following examples are given primarily by way of illustration. No details appearing therein should be construed as limitations on the present invention, except as they appear in the appended claims. All parts and percentages are by weight unless otherwise designated.

EXAMPLE 1

600 parts (5.41 equivalents) of $[Al_2(SO_4)_3 \cdot 18H_2O]$ were dissolved in 500 parts of water by heating to 60° C. After being cooled to 40° C. the solution was mechanically stirred at this temperature and a solution of 790 parts (5.6 equivalents) of sodium acetate containing 3 molecules of water of crystallization in 390 parts of water was quickly added. The pH of the final reaction mixture was 6.9. A nearly clear syrup precipitated, which underwent some solidification when the reaction mixture was continuously stirred. After standing for about 2 hours, the resulting precipitate, in the form of a crumbly cake, was broken up and suction filtered from the reaction mixture. The filter cake contained 50 to 55% of solids. The yield was from between 285 to 325 parts of solid. The undried filter cake, in this instance, could be converted into a stable slurry containing 30% solids by adding water thereto and stirring rapidly.

EXAMPLE 2

The filter cake mentioned in Example 1 above was air dried in an air circulating oven at 110° C. A light bulky powder was obtained which was readily redispersed in an aqueous medium to give a stable 30% solids dispersion.

In order to apply the basic aluminum acetate dispersion as a soil retardant to pile fabric, water was added with stirring to convert the 30% solids slurry first to a 10% solids and finally to a 1% solids suspension. This dilute suspension was then applied to a swatch of viscose pile carpet by dipping the pile portion only into a shallow bath containing the dispersion. The swatch is then squeezed until a 100% wet pick-up, based on the weight of the pile, is obtained. Thereafter, the sample is dried in a circulating oven at 105° C. until dry to the touch.

The treated viscose carpeting was not significantly whitened; nor was the hand of the sample significantly changed. The soil retardancy was found to be comparable to commercially available soil retardants.

EXAMPLE 3

66.5 parts (0.60 equivalent) of $Al_2(SO_4)_3 \cdot 18H_2O$ and 37 parts of magnesium sulfate containing 7.5 molecules of water of crystallization (0.30 equivalent) were dissolved in 200 parts of water. Into this solution there was poured during stirring 21.2 parts of sodium carbonate (0.40 equivalent) dissolved in 30 parts of water. During the addition of sodium carbonate, the solution set up in a rigid gelatinous state, which required excessive stirring in order to achieve an end product which was believed to be primarily basic aluminum sulfate. The resulting precipitate was washed with about ½ of the original volume of water in the system, which washing was accompanied by stirring. The particles contained therein were less than 1 micron in diameter and occurred singly and in small flocs.

The above product was tested as a soil retardant material on standard viscose carpeting and a soiling index of 0.75 was obtained, which was comparable to commercially available soil retardants.

EXAMPLE 4

54.2 parts (0.49 equivalent) of $Al_2(SO_4)_3 \cdot 18H_2O$ were dissolved in 75 parts of water at a temperature of between 70 and 80° C. Thereafter, the solution was cooled to about 40° C. and a second solution, having a temperature of about 40° C. and containing 51.0 parts (.54 equivalent) of sodium propionate in 60 parts of water was added thereto. The final pH of the reaction was 7.9. A precipitate formed immediately, which was diluted by the addition of 100 parts of water, after which the product was isolated. The average particle size was less than 1 micron. When this material was evaluated as a soil retardant, a soiling index of 0.80 was obtained.

EXAMPLE 5

46.4 parts (0.42 equivalent) of $Al_2(SO_4)_3 \cdot 18H_2O$ were dissolved in 43.4 parts of water and to this was added a solution of sodium butyrate to a final pH of 6.8.

The sodium butyrate solution was prepared by reacting 39 parts (0.45 equivalent) of butyric acid and 18.0 parts (0.45 equivalent) of sodium hydroxide in 59.9 parts of water at a pH of 7. A white opaque precipitate formed immediately, which was washed and isolated.

The particle size of the basic salt composition was less than 1 micron. This product, when tested for soil resistance on an all-viscose rug, gave a soiling index value of 0.73.

EXAMPLE 6

300 parts of $[Al_2(SO_4)_3 \cdot 18H_2O]$ (2.7 equivalents) were dissolved in 350 parts of water at 28° C. To this was added, with vigorous mechanical stirring, a solution of 129 parts of $Na_2CO_3$ (2.44 equivalents) dissolved in 517 parts of water. A thick, rigid, opaque, gelatinous slurry was formed which was extremely difficult to stir. The product had particles of one micron or less and the reaction mixture had a final pH of 7.1. Total solids (19 hours at 105° C.) were 18.2%. This material, when evaluated for soil retardance on standard viscose rayon pile fabric, gave good soil resistance.

EXAMPLE 7

241 parts of $AlCl_3.6H_2O$ (3.0 equivalents) and 113 parts of 86.6% $H_3PO_4$ (3.0 equivalents) were dissolved in 259 parts of water. To this was added, with vigorous mechanical stirring, a 20% solution of $Na_2CO_3$ until the pH of the system was 7.3. Total parts of 20% $NaCO_3$ added was 978 (3.69 equivalents). At the end of the precipitation, the system was a semi-rigid, translucent gel. Soil retardance on standard viscose carpeting was excellent.

EXAMPLE 8

To a solution of $[Al_2(SO_4)_3.18H_2O]$ in 500 parts of distilled water at about 40° C. and stirred at about 250 r.p.m., a solution of 736 parts of $NaOOC.CH_3.3H_2O$ in 300 parts of distilled water was added rapidly. The stirring was continued for 15 minutes after the addition and the reaction mixture was set aside for about 2-3 hours. The mixture remained clear during the addition of about 90% of the acetate solution. The final 10% produces a slight turbidity which, on standing 5 minutes, forms two liquid layers. The lower gummy layer was the basic aluminum acetate, the upper layer a concentrated solution of sodium sulfate.

The lower layer gradually became an opaque white solid which was separated by breaking up the cake and filtering.

EXAMPLE 9

A portion of the filter cake from Example 8 was dried overnight at 110° C. This material was hand ground by mortar and pestle and 100 parts of a 20% dispersion was prepared by stirring with an Eppenbach stirrer for one half hour. A stable dispersion resulted.

EXAMPLE 10

368 parts of $NaOAc.3H_2O$ was dissolved in 195 parts of water and stirred by means of an Eppenbach stirrer. Liquid alum, iron free, 54.5% $[Al_2(SO_4)_3.18H_2O]$ was added dropwise to a pH of 7.1. This required a total of 275 parts of alum. High speed stirring was used. The ingredients were mixed at room temperature. The supernatant liquid was decanted and the solid sucked free of liquor by suction. Overnight drying of the filter cake at 110° C. gave 46.0% solids.

EXAMPLE 11

A portion of the filter cake from Example 10 which had been dried overnight at 110° C. was hand ground and easily dispersed in water to make 100 grams of a 20% dispersion by stirring with an Eppenbach stirrer for one-half hour. A stable dispersion resulted.

EXAMPLE 12

To a solution of 23.2 parts of aluminum sulfate octa-decahydrate, in 24 parts of water at room temperature, a solution of 22.9 parts of sodium butyrate in 30 parts of water was added with stirring to a final pH of 7.5. The product precipitated in the form of a cake. The cake was broken and filtered. The cake contained 27.3% of the basic aluminum butyrate. The molar butyrate to sulfate ratio in this preparation was 2.0:1.

EXAMPLE 13

A portion of the product of Example 12 was dried to constant weight. The dry material was soft and powdery. A dispersion containing 20% of this material in water was made by stirring with an Eppenbach stirrer. A stable dispersion resulted.

EXAMPLE 14

547 parts of $Al_2(SO_4)_3.18H_2O$ in aqueous solution was added in small increments to 1000 parts of a 20% $Na_2CO_3$ solution with vigorous stirring. No rigid gel formation took place. 1305 parts of wet product was obtained. The solids, as determined by overnight drying at 110° C., were 21.8%.

One hundred grams of a 20% dispersion was readily prepared by the addition of the required amount of water and one-half hour stirring.

EXAMPLE 15

A portion of Example 14 was dried overnight at 110° C. and used to make a readily prepared dispersion by the procedure outlined under Example 9.

The results obtained on applying the products obtained from Examples 8 through 15 at 1% solids on standard viscose carpeting by padding, tumbling 1½ minutes and drying for 40 minutes at 105° C. are given in Table I hereinbelow.

*Table I*

| | Soil Index | Dusting | Yellowing | | Hand | Whitening (Red Carpet) |
|---|---|---|---|---|---|---|
| | | | Initial | 1' at 300° F. | | |
| SR #1 (STD) Composition containing normal phosphate salts. | 0.46 | V. Slight | Std | Std | Std | Std. |
| Example 8—Basic aluminum acetate (filter cake). | 0.49 | None | Equal | Less | Equal | Sl. more. |
| Example 9—Basic aluminum acetate (Dried). | 0.69 | do | do | do | do | Less. |
| Example 10—Basic aluminum acetate Reverse procedure (filter cake). | 0.61 | V. Slight | do | do | do | Do. |
| Example 11—Basic aluminum acetate Reverse procedure (Dried). | 0.42 | Slight | do | do | do | Do. |
| Example 13—Butyrate (Dried) | 1.00 | do | do | Less equal to untreated. | do | Sl. more. |
| Example 14—Basic aluminum sulfate as is. | 0.59 | V. Slight | do | Sl. more | do | Less. |
| Example 15—Basic aluminum sulfate. (Dried). | 0.53 | do | do | Equal | do | Do. |

STD = Standard, a value to which other indicated values are relative.

In each of the above examples, the soiling index is determined by taking a reflectance reading before and after soiling of similar pieces of treated and untreated carpeting. The reflectance reading number for the untreated soiled piece is then divided into the reflectance reading number for the treated soiled piece to arrive at a soiling index number. The treated and untreated pieces of carpeting were soiled according to the following procedure. These pieces (i.e. the treated and untreated control pieces) are fastened to a 5" x 5" window in a revolving drum for the purpose of exposing the treated and control piece to soiling. 2 grams of synthetic soil are placed in the perforated axle of the drum and 17½" steel balls and 18¼" steel balls were placed in the said drum. The opening in the drum was closed and the drum was rotated for 20 minutes. The samples were then removed and vacuumed.

While the soil retardant composition of the present invention has been disclosed particularly for use on textile materials and, in particular, viscose and cotton carpeting, it may also be applied with excellent results to fibers, yarns, threads, or fabric of wool, cotton, jute, viscose rayon, nylon, acrylics, such as Creslan, polyesters and/or blends thereof.

In addition, the basic aluminum salt compositions of this invention are effective in retarding the rate of soiling of many materials which are easily dirtied as, for example, wallpaper, lamp shades, and painted surfaces. When a dispersion has a solids content of 20% between 1⅓ and 6¾ ounces of such a dispersion per square yard of surface is adequate to provide a good soil retardant composition. For most purposes, about 3 ounces per square yard of such a dispersion is adequate. When applying the dispersion to such surfaces, it may be brushed, rolled, or sprayed on and allowed to dry at room temperature.

It should be noted that the basic aluminum salts of the present invention are greatly superior with respect to water-soluble aluminum salts and with respect to aluminum hydrate. Thus, neither of these two components functions satisfactorily as soil retardants when compared with the compositions disclosed herein. The soil retardant composition of this invention may be employed with other known soil retardants, such as normal phosphates, silicates, titanium hydrates and other known soil retardant materials. In addition, softeners, lubricants, and the like may be employed where desired and where the effectiveness of the compositions as soil retardants is not significantly reduced.

This application is a divisional application of Serial No. 647,485, filed March 21, 1957, now abandoned.

We claim:

1. A process for preparing a composition containing a major portion of insoluble basic aluminum salts having an ultimate particle size of less than .5 micron, said composition being characterized by its ability, after being rendered dry, to be readily redispersed in an aqueous medium without the aid of added dispersing agents, which comprises reacting relative amounts of 3 equivalents of a water-soluble aluminum salt and from between about 1.5 and about 2.9 equivalents of a water-soluble inorganic alkaline material by adding said inorganic alkaline material to said water-soluble aluminum salt until the final pH of the reaction mixture is between 6.5 and 8, to produce a water-soluble precipitate.

2. A process according to claim 1 wherein the water-soluble aluminum salt and water-soluble inorganic alkaline material are in aqueous solution.

3. A process according to claim 1 in which the water-soluble aluminum salt is a salt of an inorganic mineral acid.

4. A process for preparing a composition containing a major portion of insoluble basic aluminum salts having an ultimate particle size of less than .5 micron, said composition being characterized by its ability, after being rendered dry, to be readily redispersed in aqueous medium without the aid of added dispersing agents, which comprises reacting relative amounts of 3 equivalents of a water-soluble aluminum salt of an inorganic mineral acid and from about 1.5 and about 2.9 equivalents of an inorganic alkalizing agent selected from the group consisting of alkali metal, alkaline earth metal and ammonium, oxides, hydroxides, carbonates, bicarbonates, phosphates and borates by adding said inorganic alkalizing agent to said water-soluble aluminum salt until the pH of the reaction mixture is between 6.5 and 8, to produce a water-insoluble precipitate.

5. A process according to claim 4 in which the water-soluble aluminum salt of an inorganic mineral acid is aluminum sulfate.

6. A process according to claim 4 in which the water-soluble aluminum salt of an inorganic mineral acid is aluminum chloride.

References Cited in the file of this patent

UNITED STATES PATENTS

| | | |
|---|---|---|
| 2,681,291 | Ashley | June 15, 1954 |
| 2,768,996 | Bulloff | Oct. 30, 1956 |
| 2,987,474 | Wilson et al. | June 6, 1961 |